US012719344B2

(12) United States Patent
Blasi

(10) Patent No.: US 12,719,344 B2
(45) Date of Patent: Aug. 25, 2026

(54) MAGNETIC COUPLING ASSEMBLY

(71) Applicants: Robert A. Blasi, Pratt, KS (US); Teresa K. Blasi, Pratt, KS (US)

(72) Inventor: Robert A. Blasi, Pratt, KS (US)

( * ) Notice: Subject to any disclaimer, the term of this patent is extended or adjusted under 35 U.S.C. 154(b) by 179 days.

(21) Appl. No.: 18/433,041

(22) Filed: Feb. 5, 2024

(65) Prior Publication Data

US 2024/0223061 A1 Jul. 4, 2024

(51) Int. Cl.
*H02K 49/10* (2006.01)
*E05F 15/59* (2015.01)

(52) U.S. Cl.
CPC ............ *H02K 49/106* (2013.01); *E05F 15/59* (2015.01); *E05Y 2201/708* (2013.01); *E05Y 2900/106* (2013.01)

(58) Field of Classification Search
CPC ...... H02K 49/102; H02K 49/106; H02K 7/18; H02K 7/1823; E05F 15/59; E05Y 2201/46; E05Y 2201/708; E05Y 2600/502; E05Y 2800/108; E05Y 2800/412; E05Y 2900/106
See application file for complete search history.

(56) References Cited

U.S. PATENT DOCUMENTS 5,844,340 A * 12/1998 Noda .................... F15B 15/086 92/88
6,011,334 A * 1/2000 Roland .................... H02K 7/11 310/104
6,084,326 A * 7/2000 Nagai ...................... H02K 7/06 74/424.89
2025/0052262 A1* 2/2025 Blasi ..................... F15B 15/086

FOREIGN PATENT DOCUMENTS

CN 115021517 A * 9/2022 ........... H02K 49/106

OTHER PUBLICATIONS

"Airlift Doors, Inc., Owners Manual, Air Operator, Magnaglide"; Airlift Doors, Inc. www.airliftdoors.com.

(Continued)

*Primary Examiner* — Tulsidas C Patel
(74) *Attorney, Agent, or Firm* — Kenneth H. Jack; Davis & Jack, L.L.C

(57) ABSTRACT

A magnetic coupling assembly incorporating a sleeve having longitudinal and oppositely longitudinal ends; a first hydraulic seal fixedly attached to the sleeve, and being positioned at the sleeve's longitudinal end; a second hydraulic seal fixedly attached to the sleeve, and being positioned at the sleeve's oppositely longitudinal end; a plurality of magnets fixedly attached to the sleeve and positioned between the first and second hydraulic seals; the sleeve including longitudinal and an oppositely longitudinal segments; and incorporating first and second wiper rings, fixedly attached to the sleeve, the first wiper ring being positioned longitudinally from the first hydraulic seal, and the second wiper ring being positioned oppositely longitudinally from the second hydraulic seal; the sleeve forming a lubricant reservoir which is outwardly closed by the sleeve, the lubricant reservoir being longitudinally closed by the first hydraulic seal and oppositely longitudinally closed by the second hydraulic seal.

8 Claims, 12 Drawing Sheets

(56) References Cited

OTHER PUBLICATIONS

"Airlift Install Guide, Magnaglide Air Opener, Magnaglide Air Opener, Horizontal Mount"; Airlift Doors, Inc. www.airliftdoors.com.
"Airlift Doors, Inc., Magnaglide Air Opener"; Airlift Doors, Inc. www.airliftdoors.com.
"Airlift Doors, 2" Magnaglide Air Opener"; Airlift Doors, Inc. www.airliftdoors.com.
"Airlift Doors, Magnaglide Operator Monthly Maintenance Guide"; Airlift Doors, Inc. www.airliftdoors.com.
"Specifications for Magnaglide TM Air Powered Opener"; Airlift Doors, Inc. www.airliftdoors.com.
"Airlift Doors, Magnaglide Door Operator—Horizontal"; Airlift Doors, Inc. www.airliftdoors.com.
"Airlift Doors, Magnaglide Door Operator—Vertical"; Airlift Doors, Inc. www.airliftdoors.com.
"Magnaglide Air Operator Vertical Mount, Install Guide, Trouble Shooting Guide, Maintenance Manual"; Airlift Doors, Inc. www.airliftdoors.com.

* cited by examiner 3
10
14oℓ
14ℓ
16
18
20
21oℓ
21ℓ
22
24
26
44
46
48
50
52
54
56
57
58
60
61
62
64
65
66
67
68
88
92
6
7
8
9

2
88
48
14ol
8
9
10
26
64
68
58
60
24
20
54
52
67
14l
7
6
44
3A
92

1
2
5
8
6
10
14a
14
20
24
26
28
40
42
44
48
52
54
58
60
67
88
92
s
n 1
2
5
6
8
10
14oℓ
14ℓ
20
24
26
28
40
42
44
48
52
54
58
60
67
88
92
n
s 74
72ℓ
90
91
46
93
16
52
54
14ℓ
67
54

92
14ℓ
20
14oℓ
56
54
62
52
66
58
60
8
48
88

2
88
48
78
72ol
58
14ol
80
84
20
54
82
72l
76
14l
78

44
92
88
2

100
48A
88A
14Aoℓ
72Aoℓ
78A
104
102
1A
76A
14Aℓ
78A
72Aℓ
88A
44A
100

MAGNETIC COUPLING ASSEMBLY

FIELD OF THE INVENTION

This invention relates to magnetic couplers which are adapted for facilitating of powered linear motion of articles such as track guided overhead garage doors. More particularly, this invention relates to such couplers which include special adaptations for protection against frictional wear and debris fouling.

BACKGROUND OF THE INVENTION

Magnetic coupling and linear motion actuating assemblies commonly comprise a pneumatic tube or cylinder which encases a slidably mounted pneumatic piston. Permanent magnets are known to be mounted upon such pneumatic pistons so that, upon compressed air induced linear motions of the piston along the hollow bore of the pneumatic tube, magnetic fields or magnetic flux emanating from the piston's magnets progressively move longitudinally along the outer surface of the pneumatic tube.

A hollow bored sleeve is known to be slidably mounted over the tube, such sleeve correspondingly supporting permanent magnets whose magnetic fields or magnetic flux emanate inwardly. Air pressure induced longitudinal movements of the pneumatic piston and the permanent magnets mounted thereon cause the piston's magnetic fields to engage the magnetic sleeve's inwardly emanating magnetic fields. Accordingly, the air pressure induced longitudinal movements of the pneumatic tube's interior piston effectively magnetically engage and carry the outer sleeve longitudinally along the tube.

Article carrying linkages such as garage door lift attachments are known to be attached to such magnetic sleeves, advantageously allowing the air pressure induced movements of the interior piston to forcefully carry the outer sleeve, and to forcefully drive or carry such cylinders' linkage. A heavy article, for example a garage door, may be raised and lowered by such linkage assembly.

Frictional wear often undesirably occurs at contact surfaces between such outer magnetic sleeves and inner pneumatic tube, prematurely degrading and disabling the assembly. Dirt and debris also often undesirably enters the annulus between the pneumatic tube and inner surfaces of the outer magnet bearing sleeve. The instant inventive magnetic coupling assembly solves or ameliorates such problems, defects, and deficiencies of such commonly known magnetic coupling assemblies, by specially adapting the assembly to provide substantially continuous lubrication of contact surfaces at and within the anulus which divides the inner tube and the outer sleeve.

OBJECT AND SUMMARY OF THE INVENTION

The instant inventive magnetic coupling assembly comprises a sleeve having open longitudinal and oppositely longitudinal ends, such sleeve defining a longitudinally extending hollow bore. In a preferred embodiment, the sleeve component is composed of a durable and magnetically transparent metal material such as aluminum or non-magnetic stainless steel.

Further structural components of the instant inventive magnetic coupling assembly comprise longitudinal and oppositely longitudinal seals, preferably hydraulic seals, which are fixedly mounted upon the sleeve component. Such seal are preferably respectively positioned at longitudinal and oppositely longitudinal ends of the sleeve's hollow bore.

The sleeve in combination with the longitudinally and oppositely longitudinally positioned seals preferably forms and defines a lubricant reservoir or annulus. The inner surface or inner wall of the sleeve defined, bounds and closes the outer end of such reservoir, and the longitudinal and oppositely longitudinal seals respectively define, bound, and close longitudinal and oppositely longitudinal ends of the reservoir.

Further structural components of the instant inventive magnetic coupling assembly comprise a first plurality or series of permanent magnets which is fixedly mounted upon the sleeve. Such magnets are preferably positioned between the longitudinal and oppositely longitudinal seals, and are preferably arranged to inwardly emanate or project strong magnetic fields or lines of magnetic flux inwardly toward the sleeve's hollow bore.

In use of the instant inventive magnetic coupling assembly, a longitudinally elongated tube may be slidably extended through the central openings of the longitudinal and oppositely longitudinal seals, causing the tube to traverse the sleeve's hollow bore. Upon such tube extension, the tube inwardly underlies the sleeve's magnets, and the tube's outer surface advantageously bounds, defines, and closes the inner end of the lubricant reservoir. Accordingly, upon extension of the tube through the sleeve the assembly's lubricant reservoir is advantageously hermetically sealed against fluid leakage.

In a preferred embodiment, a permanent magnet bearing pneumatic piston is slidably inserted into the hollow bore of the tube, such piston being longitudinally positioned so that the piston's permanent magnets radially inwardly underly the sleeve's magnets. Upon such magnet alignment, magnetic flux or fields radially outwardly and radially inwardly emanating from the magnet's north and south poles lockingly engage each other. Such engaged and interlocking magnetic fields effectively translate longitudinal motions of the piston into longitudinal motions of the outer sleeve.

Upon filling of the reservoir with a lubricant such as hydraulic fluid sliding points of contact between the longitudinal and oppositely longitudinal seals and the outer surface of the tube are advantageously constantly lubricated. Such seals advantageously centrically align the tube within the sleeve to avoid frictional wear points while constantly lubricating annular contacts at the radially inner surface of the hydraulic seals.

Accordingly, objects of the instant invention include the provision of structures as described above and include arrangement of those structures in relation to each other in manners described above to perform and achieve the objects, benefits, and advantages described above.

Other and further objects, benefits, and advantages of the instant invention will become know to those skilled in the art upon review of detailed description which follows, and upon review of the appended drawings.

BRIEF DESCRIPTION OF DRAWINGS

FIG. 3A is a magnified view of a portion of the FIG. 3 structure, as indicated in FIG. 3.

DETAILED DESCRIPTION OF THE INVENTION

Figure 1:
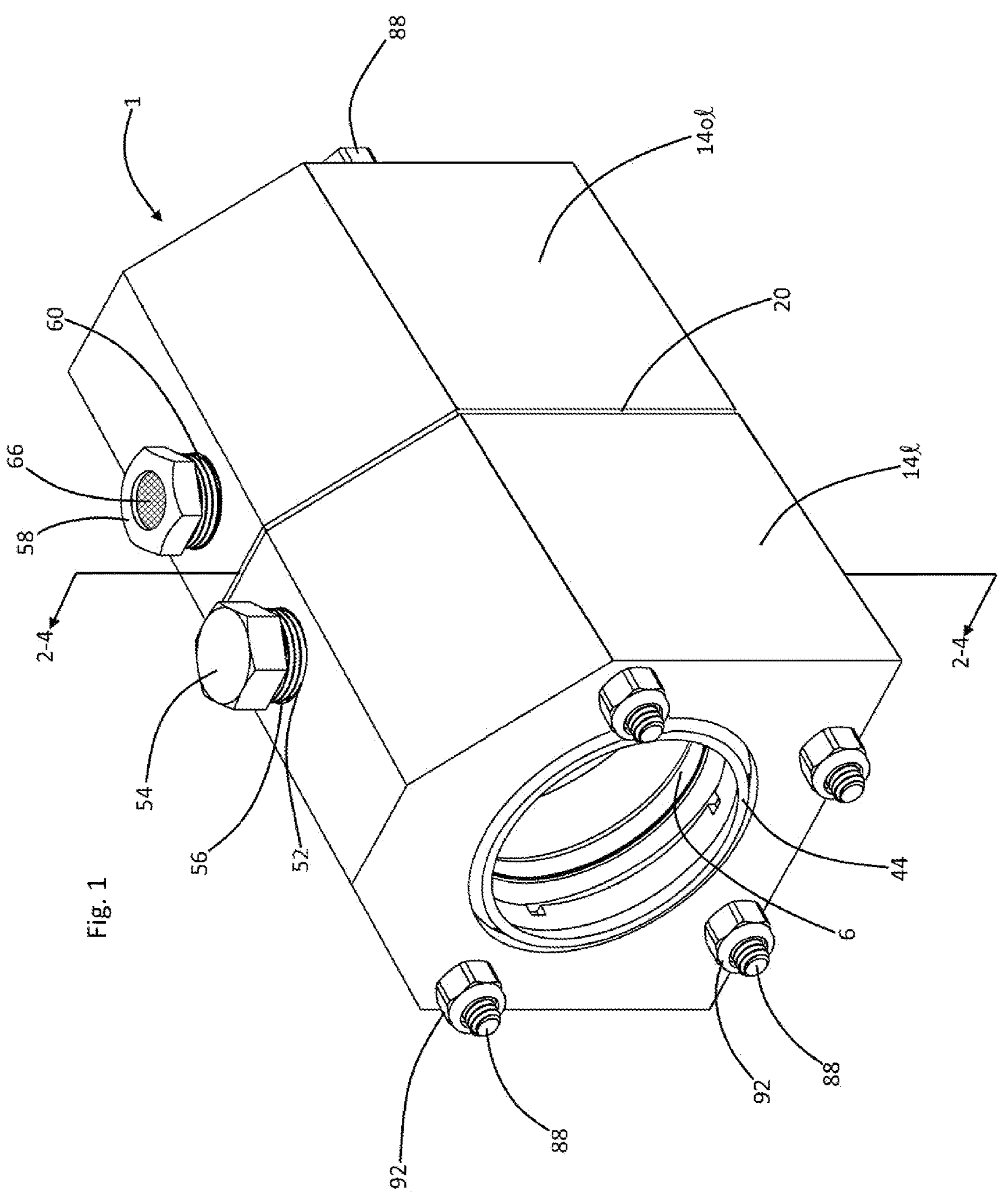
FIG. 1 is a perspective view of a preferred embodiment of the instant inventive magnetic coupling assembly.
Figure 2:
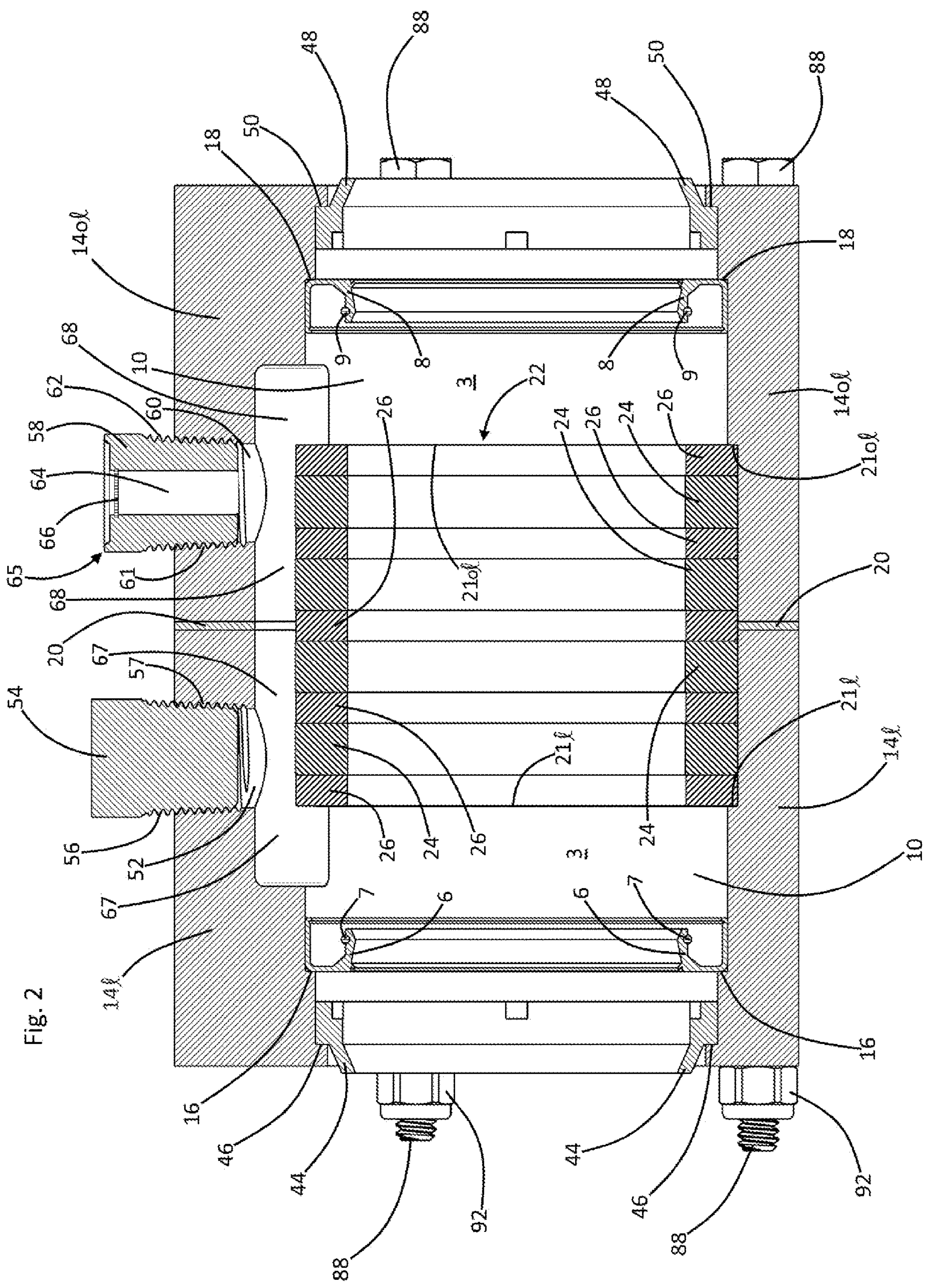
FIG. 2 is a sectional view as indicated in FIG. 1.

A first structural component of the instant inventive magnetic coupling assembly comprises a sleeve which is referred to in FIG. 1 generally by reference arrow 1. The sleeve 1 is preferably composed of a ridged magnetically transparent metal such as aluminum or non-magnetic stainless steel. Referring further simultaneously to FIG. 2, the sleeve 1 forms and defines a hollow interior space 3 which extends longitudinally from the sleeve's oppositely longitudinal end (i.e. the rightward end according to view of FIG. 2) to the sleeve's longitudinal end (i.e. the sleeve's leftward end according to the view of FIG. 2). In the preferred embodiment, the sleeve 1 is segmented to include a longitudinal segment 14*l* and an oppositely longitudinal segment 14*ol*. A fluid sealing gasket 20 between such segments 14*l* and 14*ol* spans between and hermetically interconnects such segments.

Figure 5:
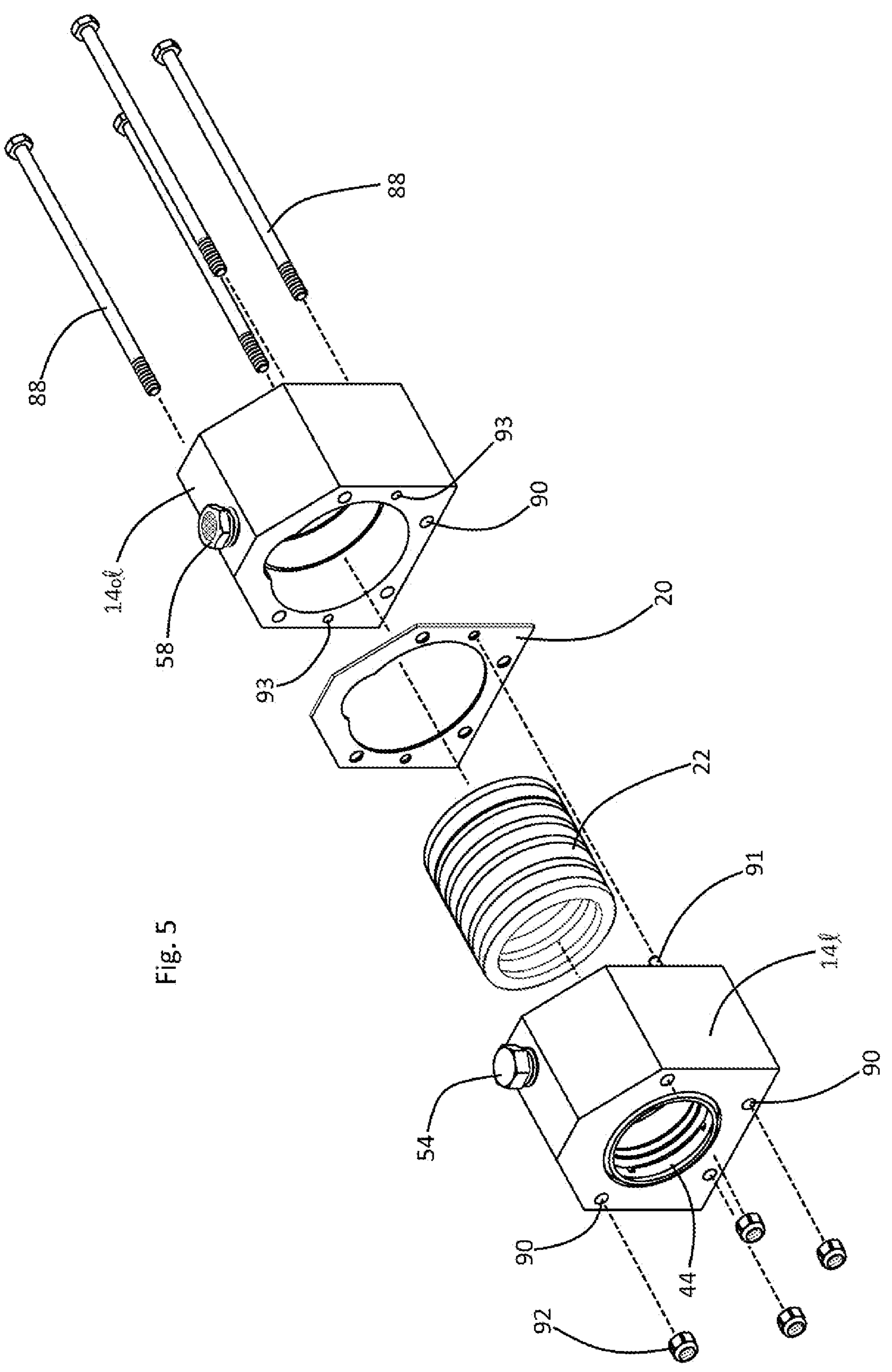
FIG. 5 is an exploded view of components of the structure of FIG. 1.
Figure 6:
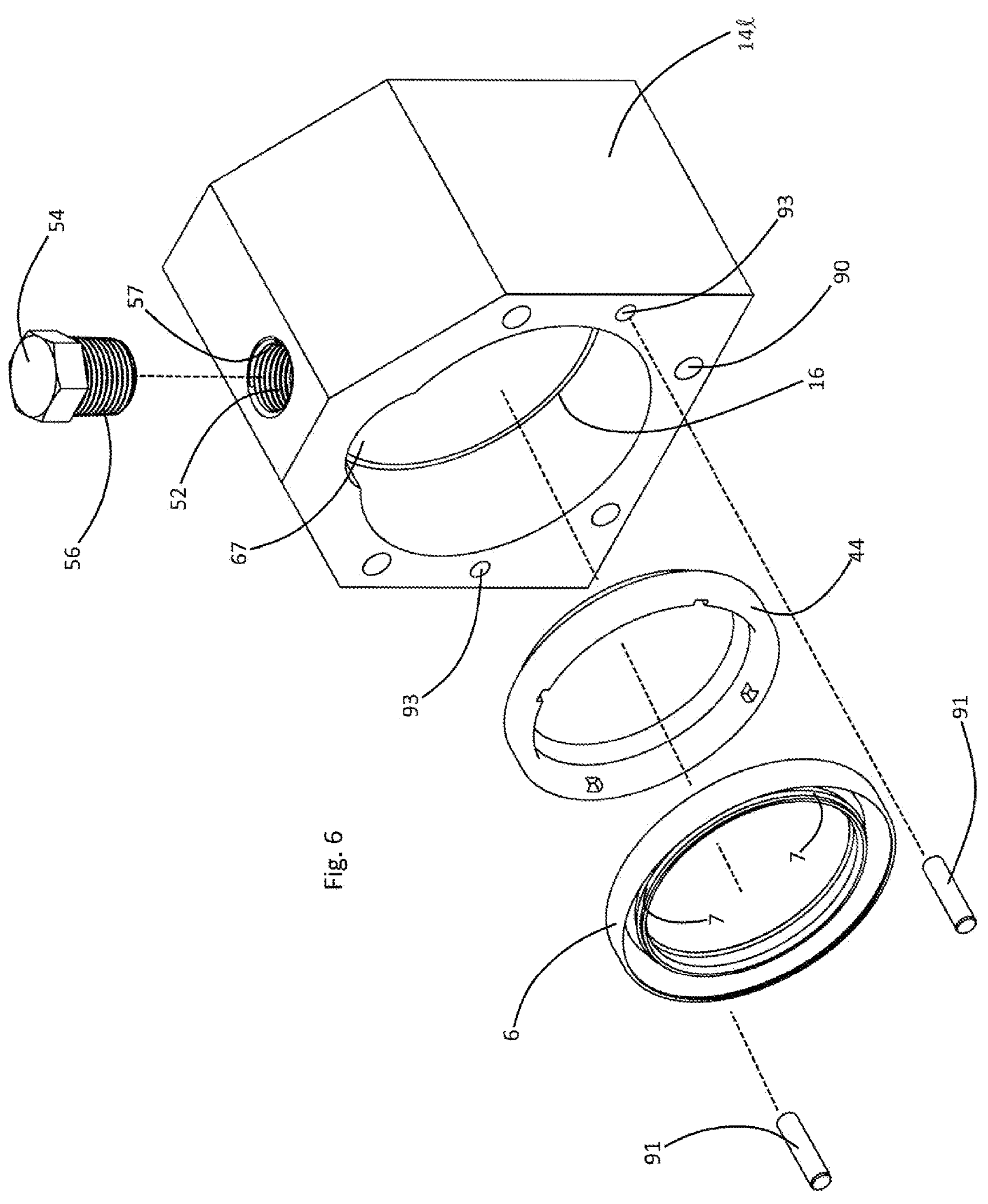
FIG. 6 is an exploded view of components of a lateral sleeve half of the FIG. 5 structure, such lateral sleeve half being in opposite perspective.
Figure 7:
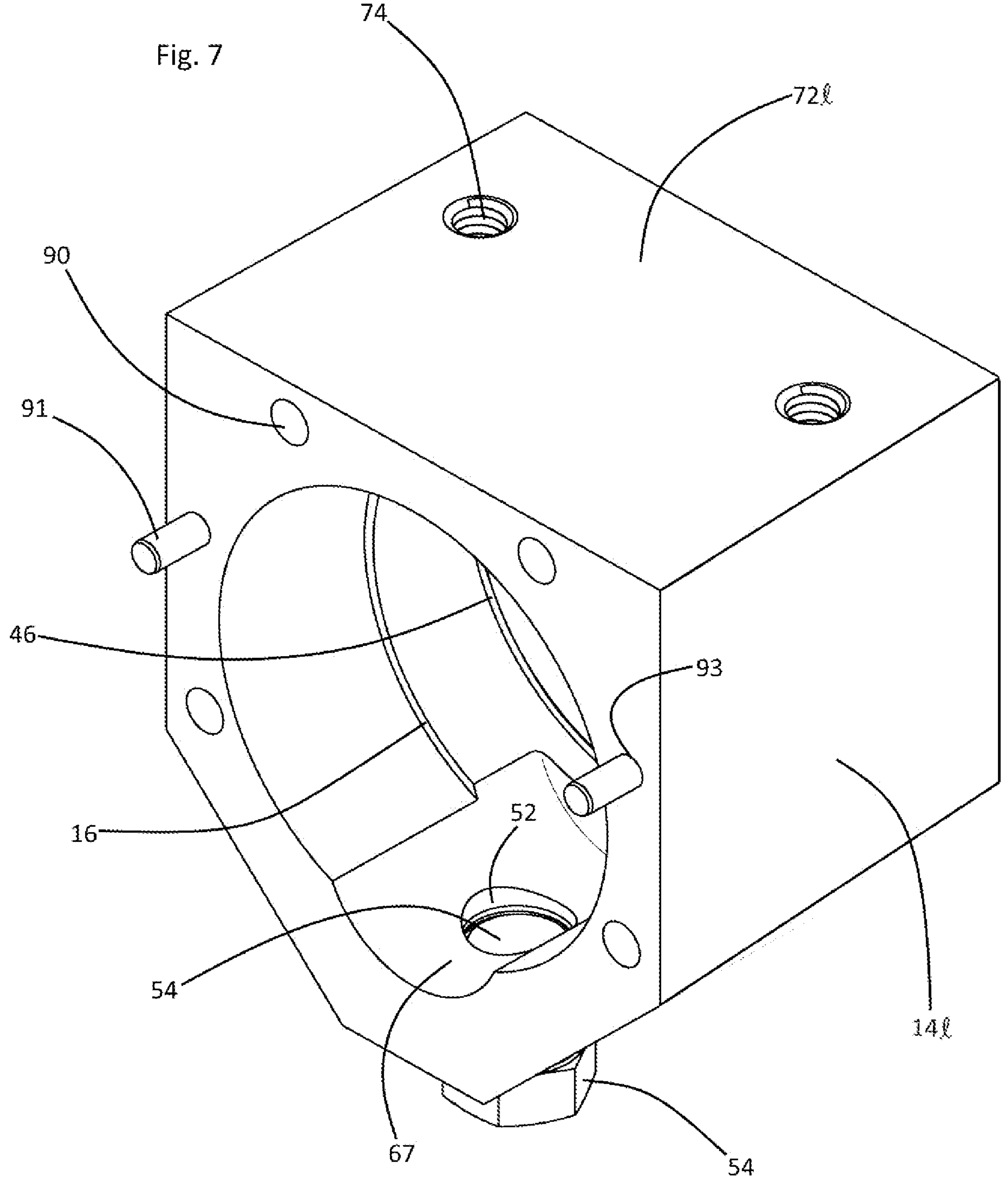
FIG. 7 is a reversed and inverted view of the lateral sleeve half.
Figure 8:
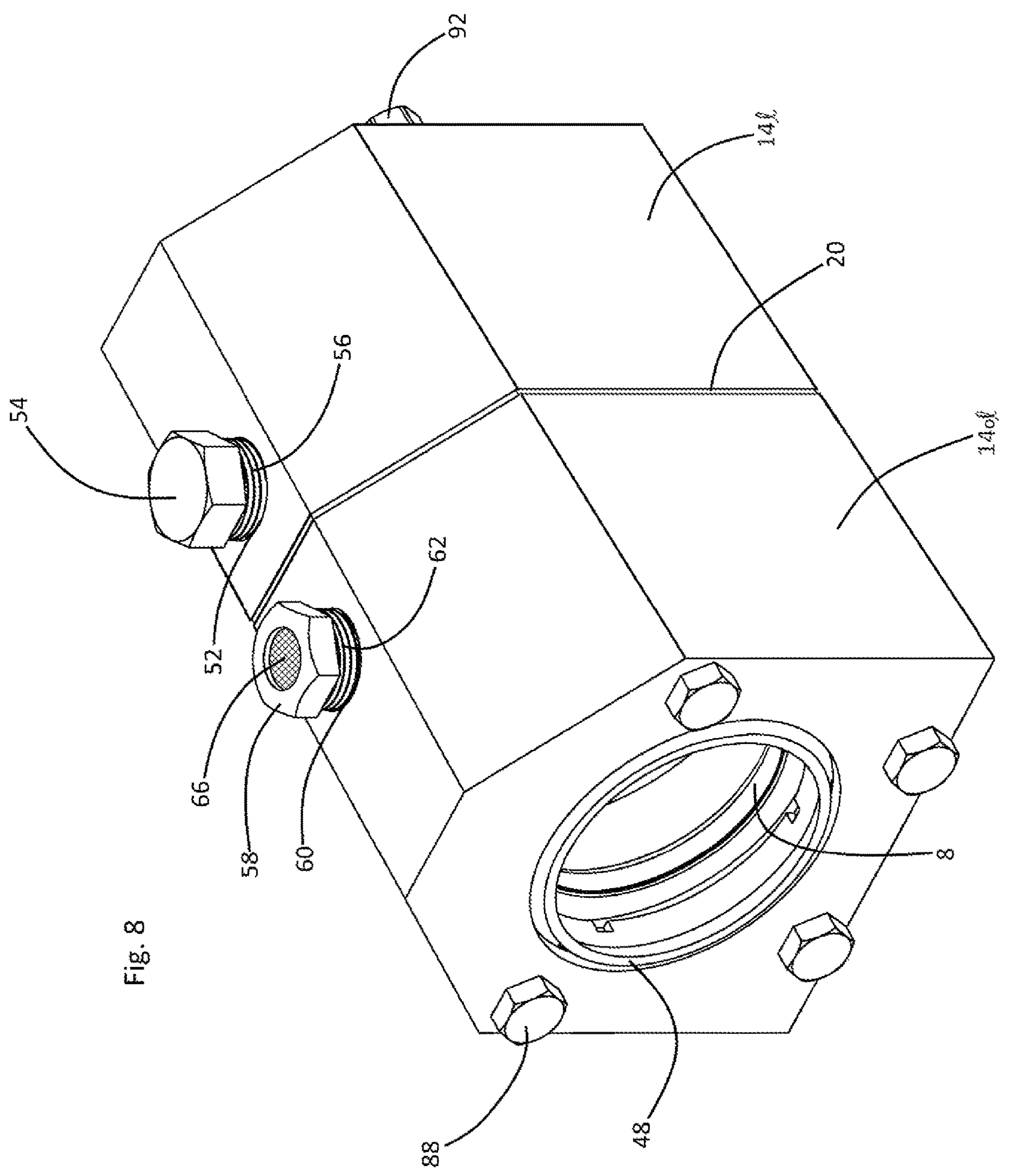
FIG. 8 is a reverse view of the structure of FIG. 1.

Referring further simultaneously to FIGS. 5, 6, and 7, the sleeve's longitudinal and oppositely longitudinal segments 14*l* and 14*ol* include longitudinally extending bolt receiving channels 90 which receive bolts 88. Upon their longitudinal extensions, the bolts 88 are secured by self-locking nuts 92. The gasket 20 is sandwiched interstitially between the longitudinal and oppositely longitudinal ends of the oppositely longitudinal and longitudinal segments 14*ol* and 14*l* of the sleeve 1. Guide pins 91 which engage sockets 93 facilitate proper alignment of the segments preliminary to bolt installations.

The inner wall of the longitudinal segment 14*l* of the sleeve 1 preferably includes at its longitudinal end an annular and oppositely longitudinally facing seal seating land 16. Correspondingly, the oppositely longitudinal segment 14*ol* of the sleeve 1 includes a longitudinally facing annular seal seating land 18. Additional seating lands 46 and 50 are preferably respectively formed at the longitudinal and oppositely longitudinal ends of the sleeve 1; annular seating land 46 facilitating positioning and seating of a longitudinal wiper ring 44, and annular seating land 50 facilitating positioning and seating of an oppositely longitudinal wiper 48.

Prior to the bolted interconnection of the sleeve's longitudinal and oppositely longitudinal sections 14*l* and 14*ol*, the longitudinal wiper ring 44 and a longitudinal hydraulic seal 6 may be successively driven longitudinally through the hollow interior space 3 of the sleeve's longitudinal segment 14, such successive installations causing wiper ring 44 to seat against annular land 46, and causing the hydraulic seal 6 to seat against annular land 16. The oppositely longitudinal wiper ring 48 and an oppositely longitudinal hydraulic seal 8 may be similarly and correspondingly preliminarily driven oppositely longitudinally through the hollow interior 3 of segment 14*ol*, causing the oppositely longitudinal wiper ring 48 and the oppositely longitudinal hydraulic seal 8 to successively seat against lands 50 and 18.

Figure 3:
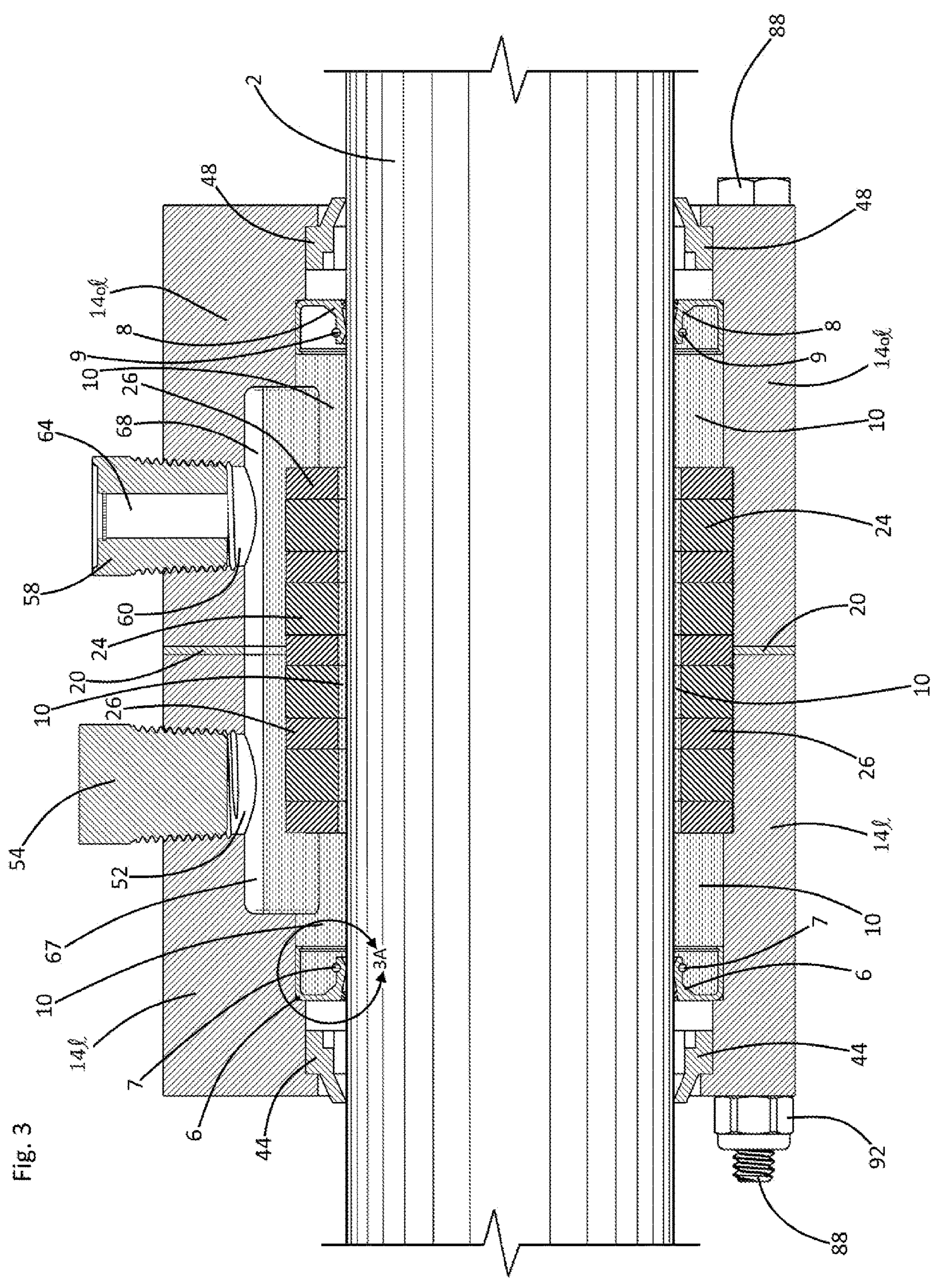
FIG. 3 re-depicts the view of FIG. 2, the view of FIG. 3 showing a pneumatic tube extended through the FIG. 2 structure, the view further showing a lubricant reservoir filled with hydraulic fluid.

Referring simultaneously to FIGS. 3 and 3A, the longitudinal and oppositely longitudinal seals 6 and 8 are preferably configured as annular or ring configured "C" channel members, the channel of the longitudinal seal 6 opening oppositely longitudinally, and the channel of the oppositely longitudinal seal 8 opening longitudinally. As FIG. 3A particularly shows, each such seal has an inner flange 11 which is secured against radially outward deflection by a relatively inflexible loop 7. In the preferred embodiment, the seals 6 and 8 and their integrated loops 7 are composed of durable steel.

The hollow interior space 3 of the sleeve 1 is preferably opened by at least a first port 52, such port preferably having internal or female helical threads 57 which are adapted for engaging external helical threads 56 of a plug 54. In the depicted embodiment, the hollow interior space 3 is suitably further opened by a vent which is referred to generally by reference arrow 65. In the depicted embodiment, the vent 65 comprises a main channel 60 which presents internal helical threads 61. A sleeve 58 having external helical threads 62 is threadedly mounted within the main channel 60, such sleeve 58 including a concentric subchannel 64 which communicates with the main channel 60. A debris filtering screen 66 is preferably provided, such screen spanning across the vent's subchannel 64.

The inner ends of the port 52 and the main vent channel 60 preferably expand to form enlarged inner ends 67 and 68, such ends preferably communicating oppositely longitudinally and longitudinally with each other to form a fluid expansion space at the upper end of the sleeve.

In the preferred embodiment, the longitudinal and oppositely longitudinal segments 14*l* and 14*ol* of the sleeve 1 are substantially identical to each other so that each sleeve segment component is capable of functioning both as a longitudinal segment and as an oppositely longitudinal segment.

The outside diameters of the longitudinal and oppositely longitudinal wiper rings 44 and 48 and the outside diameters of the longitudinal and oppositely longitudinal hydraulic seals 6 and 8 are preferably closely fitted to the inside diameters of the sleeve 1 at those components' seated positions. Such close fitting preferably establishes pressure fitted joints between the sleeve and the wipers 44 and 48, and between the sleeve and the seals 6 and 8. Such pressure fitted joints resist motions of the wiper and seal components away from their respective seating lands 46 and 50 and 16 and 18. Referring to FIGS. 3 and 3A, relatively inflexible steel loops 7 and 9 are preferably respectively integrally incorporated into the radially inner flanges 11 of the hydraulic seals 6 and 8, such loops 7 and 9 resisting radially outward deflections of such flanges.

Referring to FIG. 2, the interior walls of the longitudinal and oppositely longitudinal segments 14*l* and 14*ol* of the sleeve 1 are preferably further specially configured to present longitudinal and oppositely longitudinal magnet series seating lands 211 and 21*ol*. Prior to assembly of the sleeve's longitudinal and oppositely longitudinal segments 14*l* and 14*ol*, a stacked plurality of magnetic rings or a magnetic ring series 22 is preferably longitudinally inserted to initially rest against mounting land 211, or is oppositely longitudinally inserted to rest against mounting land 21*ol*. Upon bolted interconnection of segments 14*l* and 14*ol*, such lands 211 and 21*ol* securely hold the magnetic ring series 22 at the depicted axially concentric position within the hollow interior 3 of the sleeve 1.

In a preferred embodiment, the sleeve's magnetic ring series 22 includes a series of neodymium iron boron permanent magnetic rings or samarium cobalt permanent magnetic rings 24. In a preferred embodiment, each such magnetic ring 24 having axial or longitudinal magnetic polarity. Also in the preferred embodiment, the permanent magnetic rings 24 are alternatingly arranged in a ( . . . north-south, south-north, north-south, south-north, north-south . . . ) magnetic pole series. A magnetic pole piece ring 26 is preferably positioned between the longitudinally adjacent pairs of the magnetic rings 24, such magnetic ring pole pieces being composed of a material having a high level of magnetic susceptibility such as mild steel. The ( . . . north-south, south-north, north-south, south-north, north-south . . . ) polar arrangement of the magnetic rings in combination with the preferred installation of interspaced magnetically susceptible pole piece rings 26 advantageously causes each magnetic ring pole piece 26 to act as either a strong north pole or a strong south pole. Such magnetic poles strongly extending magnetic fields or lines of magnetic flux radially inwardly into the sleeve's hollow interior 3.

Referring simultaneously to FIGS. 2 and 3, a tube 2 may be slidably extended longitudinally through the hollow interior space 3 of sleeve 1. In a preferred embodiment, the tube 2 is composed of metal which is substantially magnetically transparent such as aluminum or nonmagnetic stainless steel. The outside diameter of the tube 2 is preferably slightly greater than the inside diameters of the hydraulic seals 6 and 8 and the inside diameters of the wiper rings 44 and 48. As a beneficial result of such inside diameter differentials, the longitudinal and oppositely longitudinal lips of wiper rings 44 and 48 advantageously annularly compressively contact the outer surface of the tube 2. Such wiper contacts advantageously annularly screed the outer surface of the tube 2, preventing incursions of debris at the tube's interior. The radially inner flanges 4 of the hydraulic seals 6 and 8 simultaneously compressively radially inwardly contact the tube's radially outer surface. Such compressive contact is assisted by the steel loops 7 and 9 which are integrated within seals 6 and 8. Such loops are relatively inflexible beneficially maintain compressive sealing annular contacts of the seals' radially inner flanges against the outer surface of the tube 2.

The depicted extension of tube 2 through the sleeve's hollow interior space 3, a completes a substantially closed lubricant reservoir 10, such reservoir being outwardly closed by the sleeve 1, such reservoir 10 being closed in the radially inward direction by the outer surface of the tube 2, and such reservoir being closed in the longitudinal and oppositely longitudinal directions at its longitudinal and oppositely longitudinal ends by the hydraulic seals 6 and 8. Upon removal of the helically threaded plug 54 from port 52, hydraulic fluid may be poured into the lubricant reservoir 10, such filling preferably progressing until an upper level of the fluid resides within the expanded inner ends 67 and 68 of the port 52 and the vent 60.

Referring simultaneously to FIGS. 3 and 3A, while the steel loop component 7 of hydraulic seal 6 radially inwardly compressively holds the oppositely longitudinal or distal end of seal flange 11 against the outer surface of tube 2, lubricating hydraulic fluid within reservoir 10 floods an annular interface space or valley 13 at such flange distal end. The presence of the hydraulic fluid at the interface 13 continuously supplies lubricating fluid at an annular and sliding contract interface 15 between the distal end of seal flange 11 and the outer surface of the tube 2. Accordingly, a microscopic skim layer of lubricating hydraulic oil is advantageously maintained at the compressive sliding interface 15. The oppositely longitudinal seal 8 functions substantially identically.

Figure 4:
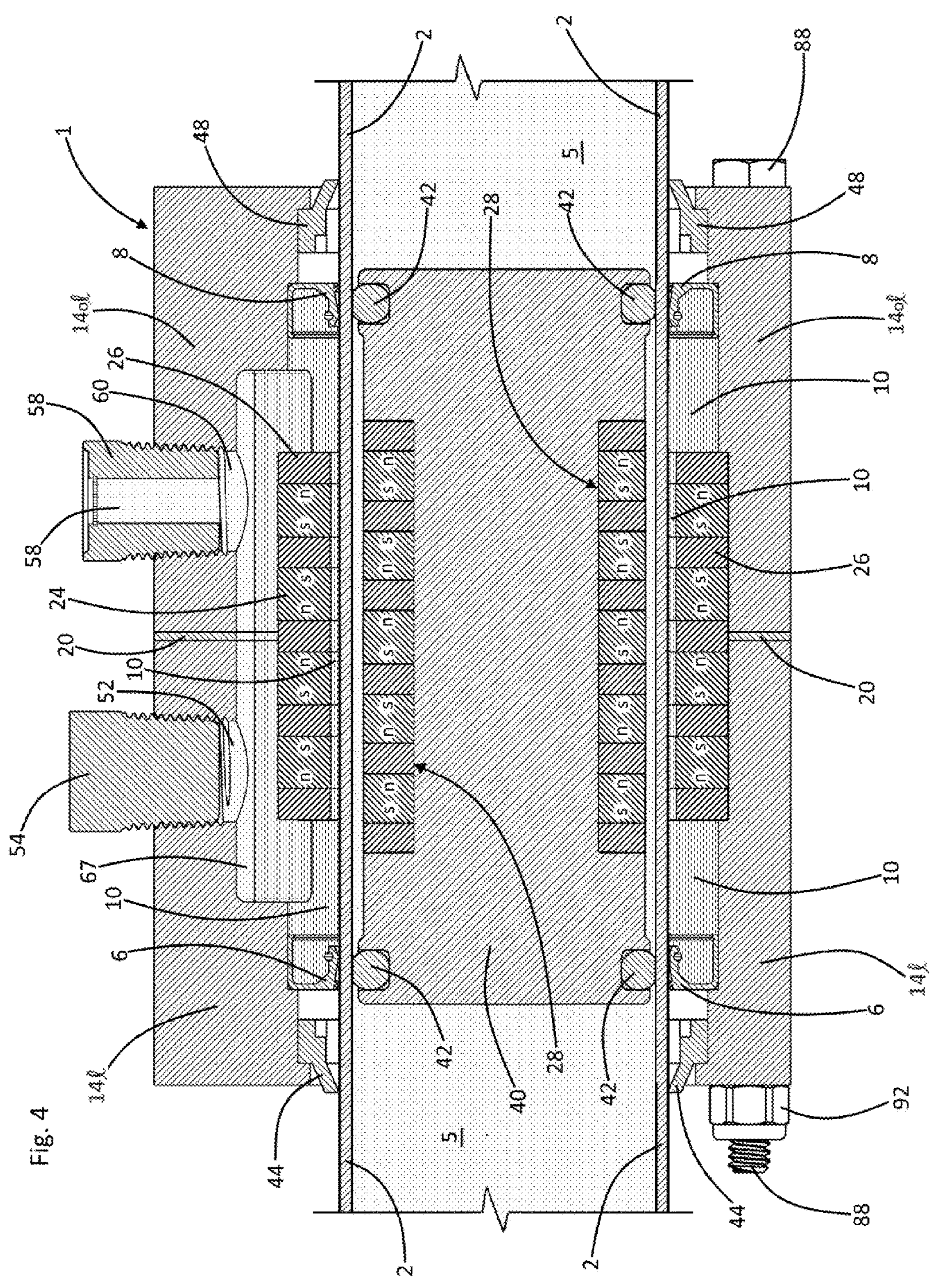
FIG. 4 re-depicts the structure of FIG. 3, the view of FIG. 4 showing the pneumatic tube structure in sectional view, the view exposing an interior magnet bearing pneumatic piston.
Figure 4:
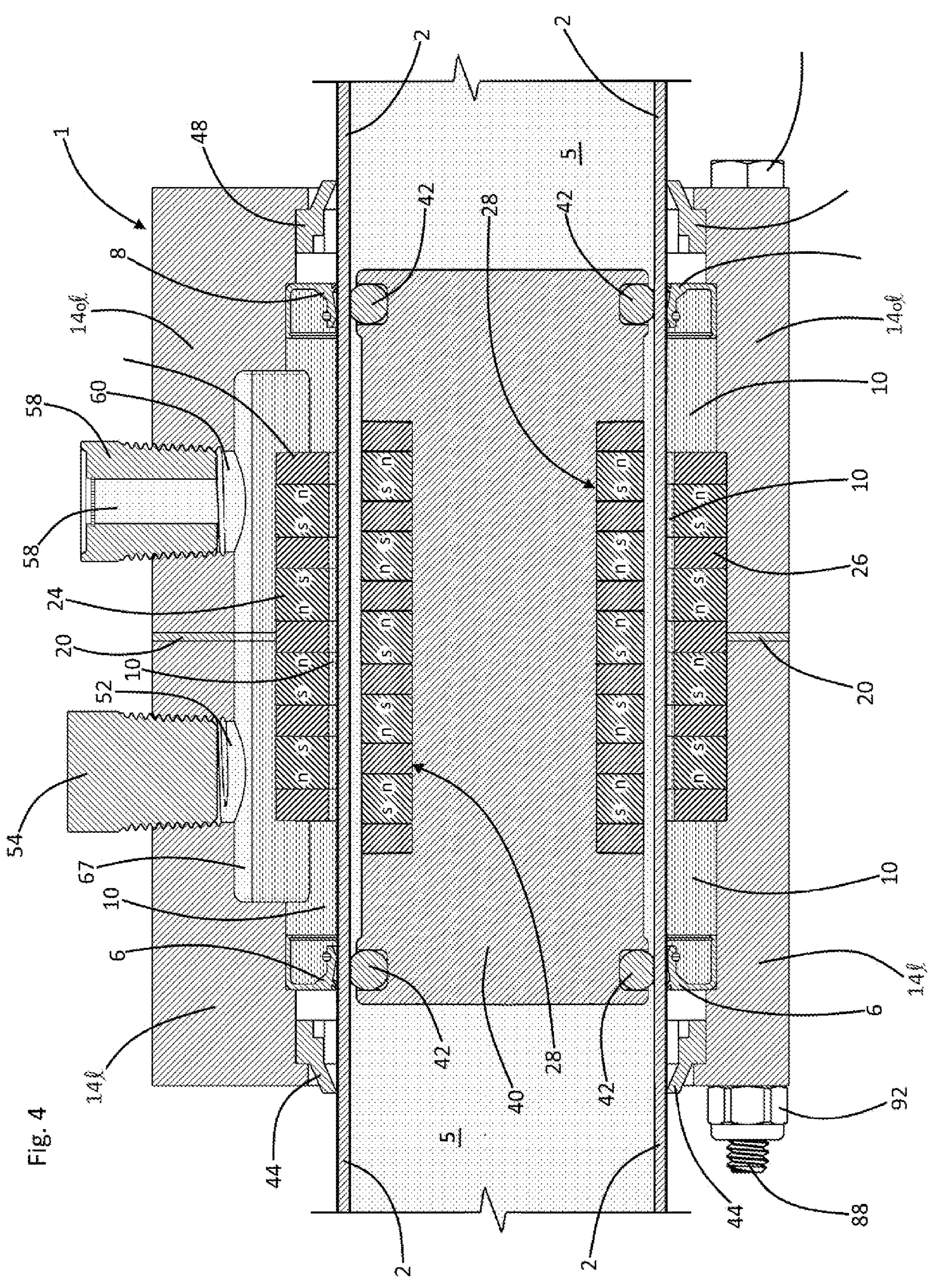

Referring further simultaneously to FIG. 4, a pneumatic piston 40 is suitably slidably mounted within the hollow interior 5 of tube 2. Air sealing O-rings 42 are preferably installed to establish sliding contacts of the piston 40 with the inner wall surface of the tube 2. A second or inner array or series of permanent magnets 28 is provided, such magnet series being configured substantially identically with permanent magnets 22. The second magnet series 28 is preferably mounted and exposed at the radially outer wall of the piston 40. Similarly with the strong radially inward magnetic force or flux emanated by the outer magnetic rings 22, the inner magnetic rings 28 strongly radially outwardly emanate lines of magnetic field force or flux.

Upon arrangement and positioning of the inner and outer or first and second magnet series 22 and 28 as indicated in FIG. 4, the magnetic pole piece polarities at the annular interface between the magnet arrays 22 and 28 are advantageously arranged in a ( . . . north-south, south-north, north-south, south-north, north-south . . . ) series. Such alternate emanations of north and south magnetic fields advantageously resist longitudinal movements of the magnet series with respect to each other. Accordingly, an injection of compressed air within the hollow bore 5 of tube 2 at the longitudinal side of piston 40 may forcefully drive the piston 40 in the oppositely longitudinal direction.

Such oppositely longitudinal motion of the piston 40 simultaneously oppositely longitudinally drives the magnetic series 22 along with the rigidly attached sleeve 1. During such motion of the sleeve 1, the inner flanges of hydraulic seals 6 and 8 slidably move along the outer surface of the tube 2, such contact points being continuously lubricated by hydraulic fluid contained within the lubricant reservoir 10. During such motions, wiper rings 44 and 48 continuously preform their debris screeding functions, clearing larger debris items from the outer surface of the tube 2, preventing contacts of debris with the seals 6 and 8.

Figure 9:
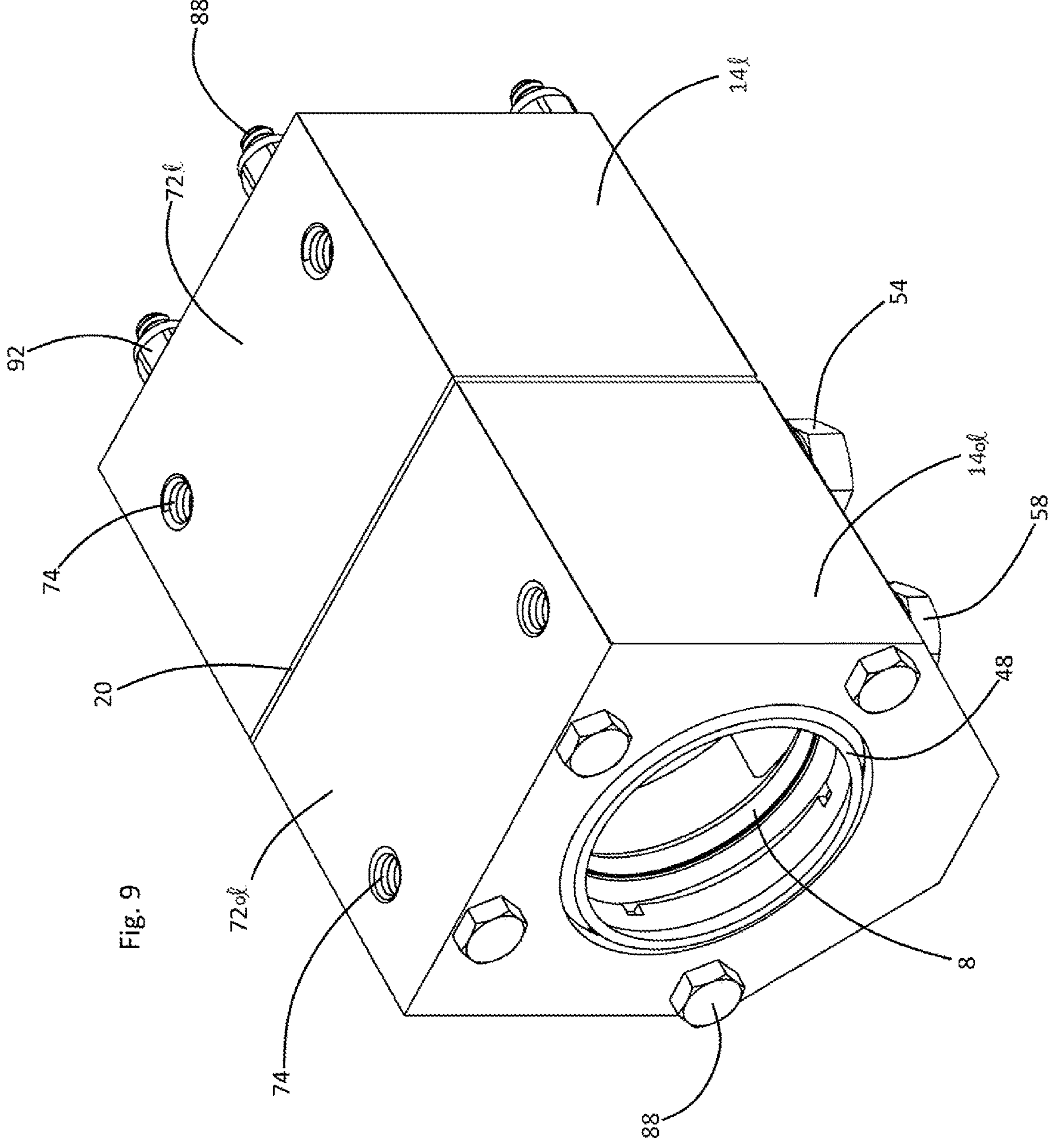
FIG. 9 is an inverted view of the structure of FIG. 8.
Figure 10:
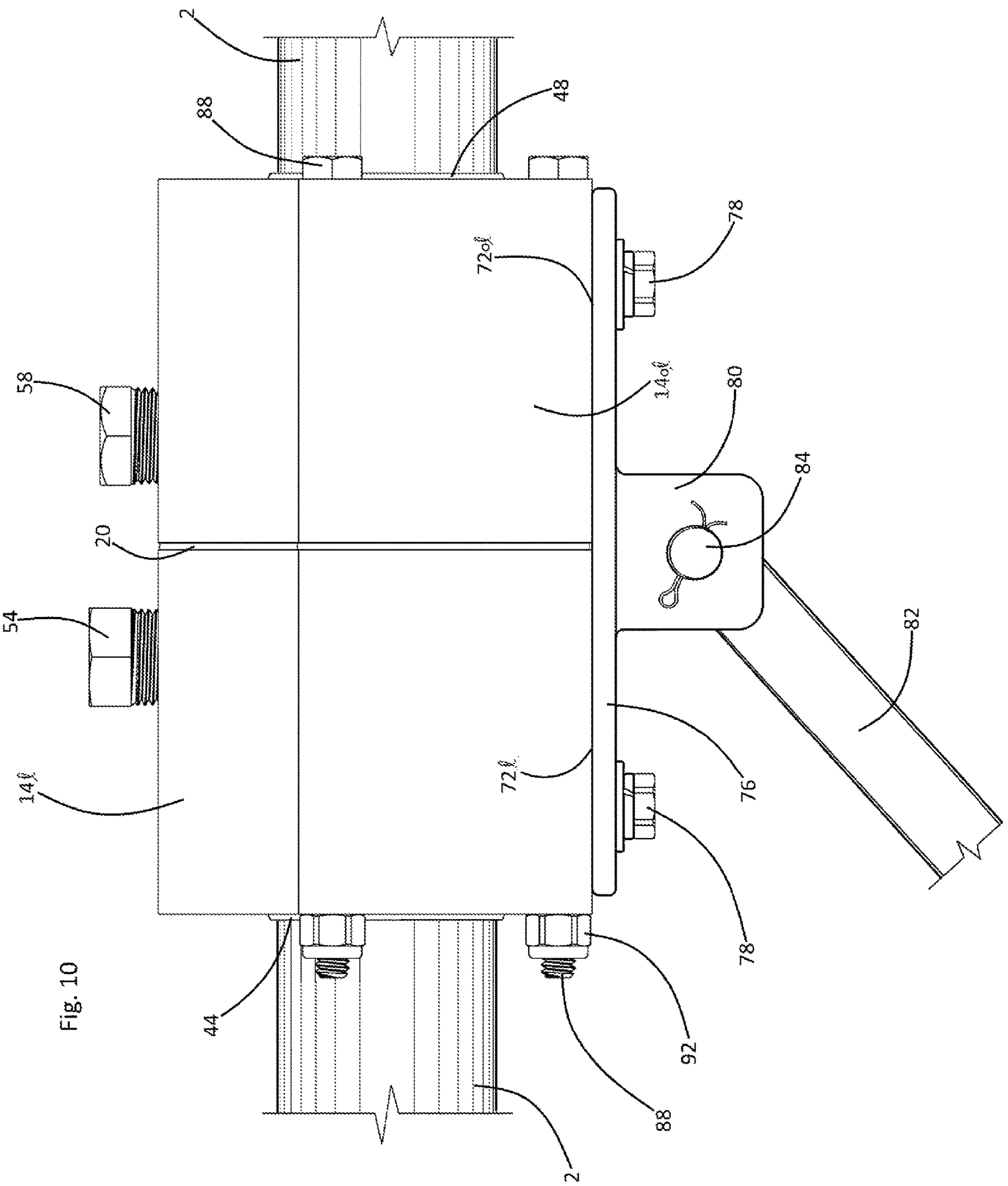
FIG. 10 is a side view of the structure of FIG. 1, the view of FIG. 10 showing a through extension of a pneumatic tube, and showing a garage door linkage.

Referring further simultaneously to FIGS. 9 and 10, a mounting land 72 including land segments 721 and 72*ol* may be advantageously formed at the lower end of the sleeve 1, such land 72 being positioned oppositely from port 52 and vent 60. As shown in the example of FIG. 10, an equipment mounting plate 76 may be rigidly secured at and upon such mounting lands 721 and 72*ol* by means of mounting bolts 78 which threadedly engage mounting sockets 74. A pin, eye, and clevis joint 80, 84 attached to mounting plate 76 may forcefully draw a lift arm 82 longitudinally along tube 2 in response to air pressure driven movement of the sleeve. Such arm 82 may, for example, attach to an upper end of a track guided overhead garage door (not depicted in views). Accordingly, pneumatic operation of the piston 40 within tube 2 may longitudinally drive sleeve 1 along tube 2, drawing lift arm 82 there along, and advantageously raising and lowering such garage door.

The instant inventive magnetic coupling assembly is particularly advantageously used where the tube 2 and lift arm 82 are installed for use in raising and lowering carwash garage doors. In such usage environment, the wipers 44 and 48 and hydraulic seals 6 and 8 advantageously protect against incursions of moisture, detergents, and debris over and about the magnets series 22 while providing for continuous lubrication of sliding contacts.

Figure 11:
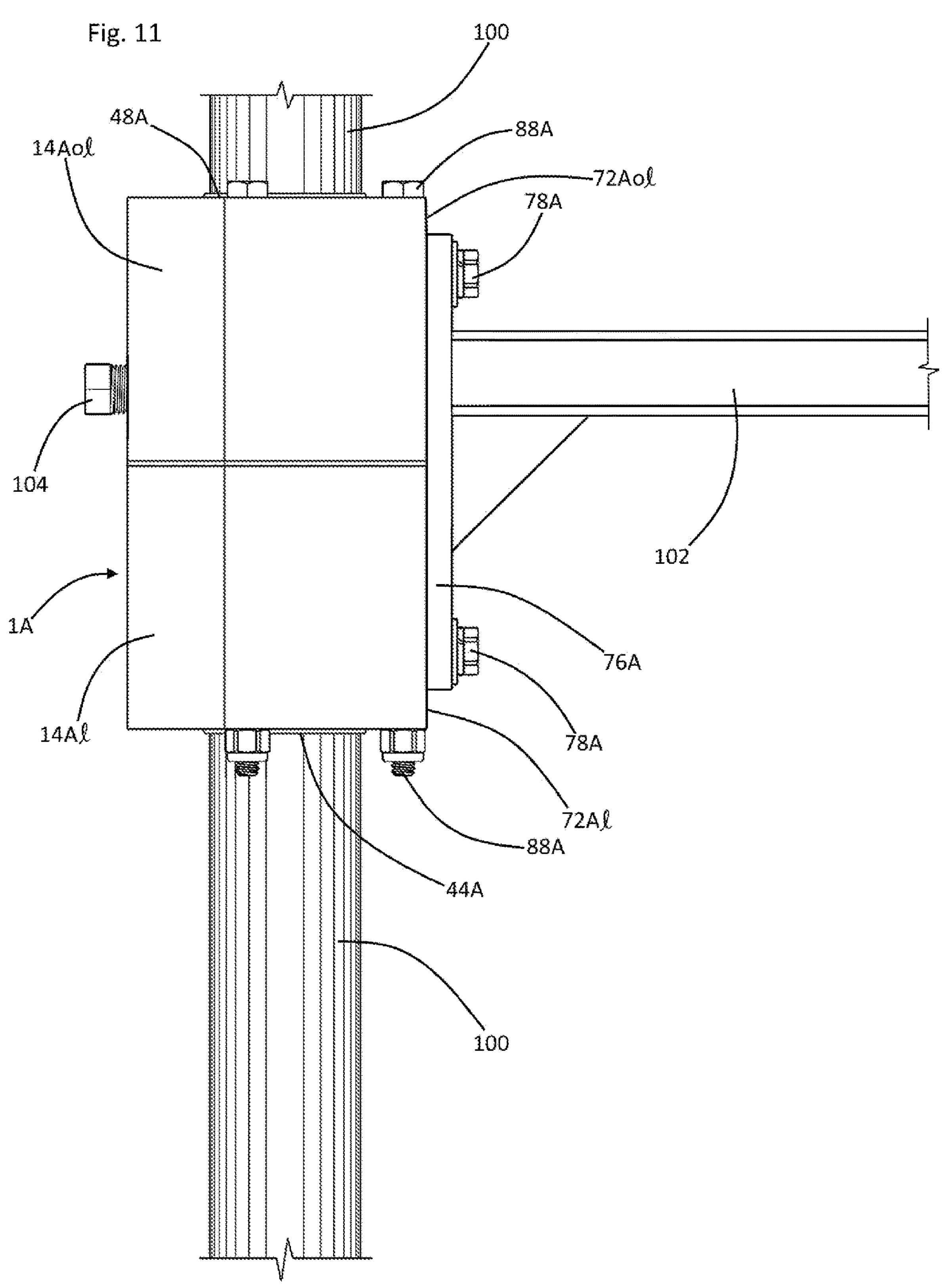
FIG. 11 presents a side view of an alternate configuration of the FIG. 1 structure, such alternate configuration including a vertically extending pneumatic tube and an attached horizontally extending boom arm.

Referring to FIG. 11, all structures identified by a reference numeral having the suffix "A" are configured substantially identically with similarly numbered structures appearing in FIGS. 1-10. In the FIG. 11 embodiment, the sleeve 1A is vertically oriented to facilitate an attachment of a vertically oriented mounting plate 76A which supports a horizontally extending boom arm 102. Pneumatically driven vertical movements of the sleeve 1A and the boom arm 102 along the vertically oriented tube 100 allow the inventive assembly to be utilized for raising and lowering articles. In the FIG. 11 configuration, the cross-sectional shape of the tube 100 is preferably circular for facilitation of both vertical motions of the boom arm 102 along the tube 100 and rotary motions of such arm about tube 100. In the FIG. 11 configuration, the vent 60 of the FIGS. 1-10 configuration may eliminated to allow the sleeve 1 to retain lubricating hydraulic fluid in the vertical orientation. Accordingly, in the FIG. 11 configuration, plug 104 may be removed for hydraulic fluid filling and may be reinstalled for hermetically sealing the lubricant reservoir.

The magnet series carrying pneumatic piston 40 depicted in FIG. 4 is intended as being representative of other linear motion actuating devices which are capable of driving or drawing the magnet series 28 longitudinally along the tube's hollow bore 5. For example, a hydraulic piston driven by pressurized hydraulic fluid (not depicted within views) would alternatively capably longitudinally drive magnets 28. Further alternatively, a jack screw linear motion actuator (not depicted within views) may be mounted within bore 5 for longitudinally driving the magnets 28 along tube 2. Further alternatively a cable pull actuator, or a chain drive may be installed within the tube 2 for drawing magnets 28 there along. While the depicted configuration of the tube 2 and piston 40 as a pneumatic linear motion actuator constitutes a preferred configuration, such alternative mechanical means for longitudinally driving or pulling the magnets 28 along hollow bore 5 are considered to fall within the scope of the invention.

While the principles of the invention have been made clear in the above illustrative embodiment, those skilled in the art may make modifications to the structure, arrangement, portions, components, and method steps of the invention without departing from those principles. Accordingly, it is intended that the description and drawings be interpreted as illustrative and not in the limiting sense, and that the invention be given a scope commensurate with the appended claims.

The invention claimed is:

1. A magnetic coupling assembly comprising:

a. a sleeve having longitudinal and oppositely longitudinal ends;

b. a first hydraulic seal fixedly attached to the sleeve, the first hydraulic seal being positioned at the sleeve's longitudinal end;

c. a second hydraulic seal fixedly attached to the sleeve, the second hydraulic seal being positioned at the sleeve's oppositely longitudinal end; and d. a first plurality of magnets mounted upon the sleeve, the first plurality of magnets being positioned between the first and second hydraulic seals.

2. The magnetic coupling assembly of claim 1, wherein, the sleeve comprises a longitudinal segment and an oppositely longitudinal segment.

3. A magnetic coupling assembly comprising:

a. a sleeve having longitudinal and oppositely longitudinal ends;

b. a first hydraulic seal fixedly attached to the sleeve, the first hydraulic seal being positioned at the sleeve's longitudinal end;

c. a second hydraulic seal fixedly attached to the sleeve, the second hydraulic seal being positioned at the sleeve's oppositely longitudinal end;

d. a first plurality of magnets fixedly attached to the sleeve, the first plurality of magnets being positioned between the first and second hydraulic seals; and e. first and second wiper rings, said rings being fixedly attached to the sleeve, the first wiper ring being positioned longitudinally from the first hydraulic seal, and the second wiper ring being positioned oppositely longitudinally from the second hydraulic seal.

4. The magnetic coupling assembly of claim 3, further comprising a lubricant reservoir, said reservoir being outwardly closed by the sleeve, said reservoir being longitudinally closed by the first hydraulic seal, and said reservoir being oppositely longitudinally closed by the second hydraulic seal.

5. The magnetic coupling assembly of claim 4, further comprising a tube, the lubricant reservoir being inwardly closed by the tube.

6. The magnetic coupling assembly of claim 5, wherein, the lubricant reservoir is opened by a port extending through the sleeve, the port being positioned between the first and second hydraulic seals.

7. The magnetic coupling assembly of claim 6, further comprising a second plurality of magnets positioned within the tube, the second plurality of magnets being further positioned inwardly from the first plurality of magnets.

8. The magnetic coupling assembly of claim 7 further comprising a component for moving the second plurality of magnets through the tube, said component being selected from the group of actuators consisting of pneumatic linear motion actuators, hydraulic linear motion actuators, jack-screw linear motion actuators, pull cable linear motion actuators, and chain drive linear motion actuators, the selected actuator being connected operatively to the tube.

* * * * *